（12）United States Patent
Gyurkovics, Jr. et al.

(10) Patent No.: US 10,228,007 B2
(45) Date of Patent: Mar. 12, 2019

(54) PANEL FASTENER (71) Applicant: Illinois Tool Works Inc., Glenview, IL (US)

(72) Inventors: Nicolas Gyurkovics, Jr., Toronto (CA); So Nguyen Lam, Toronto (CA)

(73) Assignee: ILLINOIS TOOL WORKS INC., Glenview, IL (US)

( * ) Notice: Subject to any disclaimer, the term of this patent is extended or adjusted under 35 U.S.C. 154(b) by 130 days.

(21) Appl. No.: 15/367,547

(22) Filed: Dec. 2, 2016

(65) Prior Publication Data

US 2017/0167518 A1 Jun. 15, 2017

Related U.S. Application Data

(60) Provisional application No. 62/265,002, filed on Dec. 9, 2015.

(51) Int. Cl.
| | |
|---|---|
| *F16B 19/00* | (2006.01) |
| *E04B 1/76* | (2006.01) |
| *F16B 13/04* | (2006.01) |
| *F16B 13/12* | (2006.01) |
| *E04F 13/08* | (2006.01) |

(Continued)

(52) U.S. Cl.
CPC .......... *F16B 19/008* (2013.01); *E04B 1/7629* (2013.01); *E04F 13/0832* (2013.01); *E04F 13/0837* (2013.01); *F16B 13/045* (2013.01); *F16B 13/126* (2013.01); *F16B 13/002* (2013.01); *F16B 13/143* (2013.01); *F16B 15/0092* (2013.01); *F16B 15/04* (2013.01); *F16B 19/00* (2013.01); *F16B 43/001* (2013.01); *F16B 2013/006* (2013.01)

(58) Field of Classification Search
CPC .... F16B 5/0208; F16B 13/141; F16B 13/143; F16B 15/02; F16B 19/008; F16B 19/1008; F16B 37/122; F16B 19/00; E04F 13/0832; E04F 13/0841
USPC .......... 411/44, 82, 82.3, 383, 480, 487, 913
See application file for complete search history.

(56) References Cited

U.S. PATENT DOCUMENTS

| | | | | |
|---|---|---|---|---|
| 4,652,193 | A | * | 3/1987 | Hibbs .................. F16B 13/143 411/82.3 |
| 4,892,429 | A | * | 1/1990 | Giannuzzi ............ E04D 3/3603 411/383 |

(Continued)

FOREIGN PATENT DOCUMENTS

| | | |
|---|---|---|
| DE | 4340816 A1 | 6/1995 |
| DE | 20022639 U1 | 1/2002 |

OTHER PUBLICATIONS

International Search Report issued by ISA/EPO in connection with PCT/US2016/064904 dated Oct. 2, 2017.

(Continued)

*Primary Examiner* — Roberta S Delisle
(74) *Attorney, Agent, or Firm* — Levenfeld Pearlstein, LLC (57) ABSTRACT

A panel fastener and panel fastening system are provided. The panel fastener includes a body having a collar and an elongated shank extending from the collar. The elongated shank defines an interior space and having a penetrating tip disposed at an end opposite of the collar. The panel fastener also includes a substrate fastening portion configured to be driven into a substrate and a holding mechanism connected to the substrate fastening portion and configured to engage the substrate.

14 Claims, 4 Drawing Sheets

(51) Int. Cl.
*F16B 13/14* (2006.01)
*F16B 13/00* (2006.01)
*F16B 15/00* (2006.01)
*F16B 15/04* (2006.01)
*F16B 43/00* (2006.01)

(56) References Cited

U.S. PATENT DOCUMENTS

| | | | | |
|---|---|---|---|---|
| 5,054,983 A | * | 10/1991 | Froewis | E04B 1/7633 411/480 |
| 5,171,118 A | * | 12/1992 | Rothenbuhler | E04B 1/762 411/480 |
| 5,611,474 A | * | 3/1997 | Schmidle | B25C 1/188 227/10 |
| 5,660,015 A | * | 8/1997 | Kluser | E04B 1/7629 411/392 |
| 5,779,421 A | * | 7/1998 | Beck | E04F 13/0835 411/480 |
| 5,833,420 A | * | 11/1998 | Schmidle | B25C 1/188 411/441 |
| 6,004,085 A | * | 12/1999 | Yamamoto | F16B 13/002 411/30 |
| 7,934,895 B2 | * | 5/2011 | Ernst | F16B 13/002 411/29 |
| 8,763,332 B2 | * | 7/2014 | Shadwell | E04D 5/145 411/531 |
| 8,800,836 B2 | * | 8/2014 | Scott | B25C 1/00 227/10 |

OTHER PUBLICATIONS

International Preliminary Report on Patentability issued by ISA/EPO in connection with PCT/US2016/064904 dated Jun. 21, 2018.

* cited by examiner

PANEL FASTENER

CROSS-REFERENCE TO RELATED APPLICATION DATA

This application claims the benefit of and priority to Provisional U.S. Patent Application Ser. No. 62/265,002, filed Dec. 9, 2015, the disclosure of which is incorporated herein in its entirety.

BACKGROUND

A panel of insulation may be secured to an underlying substrate, such as a wall, ceiling or floor in a number of different ways. For example, a fastener, such as a nail or screw, may penetrate through the panel and at least partially into the underlying substrate and/or a stud or support underlying the substrate. In another example, the fastener may be formed as a two-part element. The two-part element may include an attachment plate having a tubular portion configured to penetrate into the panel. The tubular portion is configured to receive a nail or similar fastener therein. A driving tool may drive the nail through a penetrating end of the tubular portion so that the nail penetrates and is received in the underlying substrate and/or stud or support underlying the substrate, thereby securing the panel to the underlying substrate.

A holding force to secure the panel to the substrate is provided by a portion of the fastener received in the substrate. The holding force may typically be attributed to frictional contact between an outer surface of the fastener and an interior surface of the substrate that the fastener has penetrated. However, in situations where the substrate is formed of a thin or hollow material, frictional contact may be limited, due to a limited contact area corresponding to the thin material, and the holding force may be reduced to unsuitable levels. In these situations, the panel may become loose and/or separated from the substrate.

To prevent undesired loosening or separation, it may be desirable to locate a stud underlying the substrate and drive the fastener through the substrate and into the stud. The additional contact between the fastener and the stud may then provide a sufficient holding force. However, locating a stud prior to driving each fastener or row of fasteners may be time consuming, difficult and/or labor intensive. In addition, it may be difficult to identify the location of the stud when the panel is positioned over the substrate for securing thereto. Further, by penetrating the substrate with the fastener, air and/or moisture may be able to seep into or through the substrate in a region of the fastener. The air or moisture may damage the substrate.

Accordingly, it is desirable to provide a fastener with improved holding force so as to limit relative movement between a panel, such as a panel of insulation, and the underlying substrate to which the panel is secured

SUMMARY

According to one embodiment, a panel fastener includes a body having a collar and an elongated shank extending from the collar. The elongated shank defines an interior space and has a penetrating tip disposed at an end opposite the collar. The panel fastener also includes a substrate fastening portion configured to be driven into a substrate and a holding mechanism connected to the substrate fastening portion. The holding mechanism is configured to engage the substrate.

In an embodiment, the substrate fastening portion is a pin having a head and a leading end. The holding mechanism may be an adhesive. In an embodiment in a first position, the pin is disposed within the interior space and the adhesive is an adhesive capsule positioned between the leading end of the pin and the penetrating tip. In a second position, the pin extends outwardly from the penetrating tip and at least a portion of the adhesive is coated on the pin. The adhesive forms an air and/or moisture barrier between the pin and the substrate to prevent air and/or moisture penetration into the substrate.

A guide can be disposed in the interior space, which guide is configured to receive the pin.

In an embodiment, the substrate fastening portion is an anchor having an internal cavity and an actuator pin positioned at least partially within the internal cavity. The actuator pin is movable relative to the cavity and the holding mechanism can be one or more fastening teeth configured to project from the anchor. In such an embodiment, in a first position the anchor is disposed in the interior space, the actuator pin is formed as a head that is spaced from a receiving end of the anchor, and the fastening teeth extend from the actuator pin and are disposed within the anchor. In a second position the anchor extends outwardly from the penetrating tip of the shank, the head of the pin contacts the receiving end of the anchor, and the fastening teeth project outwardly from the anchor.

In an embodiment, in the second position, the anchor projects partially, but not completely through the substrate such that a partial thickness of the substrate remains between a leading end of the anchor and a side of the substrate opposite to the side through which the anchor is received therein.

Such an embodiment can further includes a guide disposed in the interior space that is configured to receive the anchor. The guide can be configured to limit a depth of penetration of the anchor into the substrate.

In an embodiment, the substrate fastening portion is a pin extending from a distal end of the body and the holding mechanism comprises a screw thread positioned on an exterior of the pin.

The panel fastener can further include an air and/or moisture seal between the substrate fastening portion and the substrate. The substrate can be, for example, a gypsum board and the panel can be, for example, a panel of rigid insulation.

Other objects, features, and advantages of the disclosure will be apparent from the following description, taken in conjunction with the accompanying sheets of drawings, wherein like numerals refer to like parts, elements, components, steps, and processes.

DETAILED DESCRIPTION

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

Figure 1:
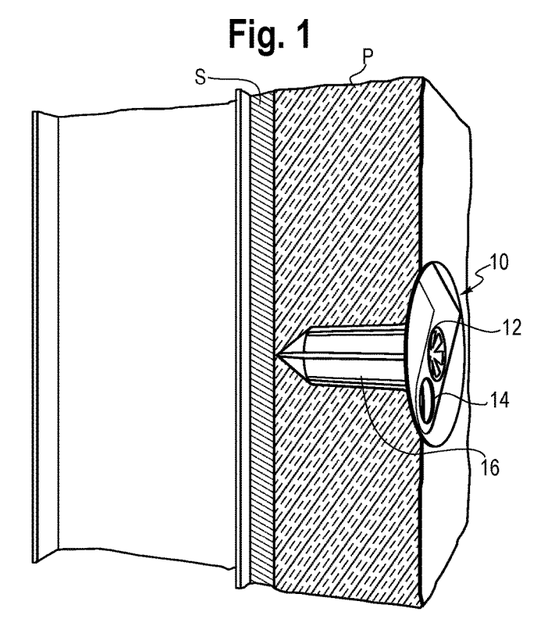
FIG. 1 is a cross-sectional perspective view showing an example of a panel fastener installed in a panel, according to an embodiment described herein.
Figure 2:
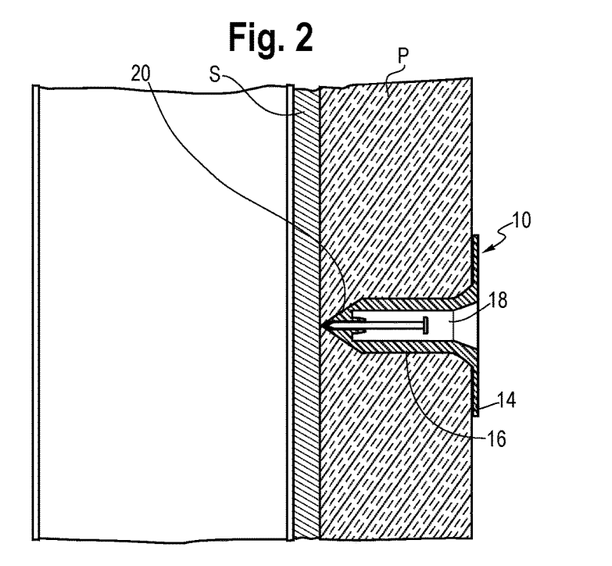
FIG. 2 is cross-sectional view of the panel fastener of FIG. 1 installed in a panel.

FIG. 1 is a cross-sectional perspective view of panel fastener 10 inserted into a panel P according to an embodiment described herein. FIG. 2 is a cross-sectional view of the panel fastener 10 inserted into the panel P. Referring to FIGS. 1 and 2, the panel fastener 10 includes a body 12. The body 12 is formed with a collar 14 and an elongated shank 16 extending from the collar 14. The elongated shank 16 defines an interior space 18.

At an external side, the elongated shank 18 includes a penetrating tip 20, formed at an end distal to the collar 14. The penetrating tip 20 is formed as a section of decreasing diameter moving along a length of the elongated shank 16 away from the collar 14. The penetrating tip 20 is configured to be driven into and penetrate the panel P, for example, to a depth where the collar 14 engages and outer surface of the panel P and the penetrating tip 20 abuts or is immediately adjacent to the substrate S to which the panel P is to be fastened. That is, the elongated shank 16 may be formed with a length that substantially coincides with a thickness of the panel P. It is understood, however, that the elongated shank 16 may alternatively have a length that is less than the thickness of the panel P.

Figure 3:
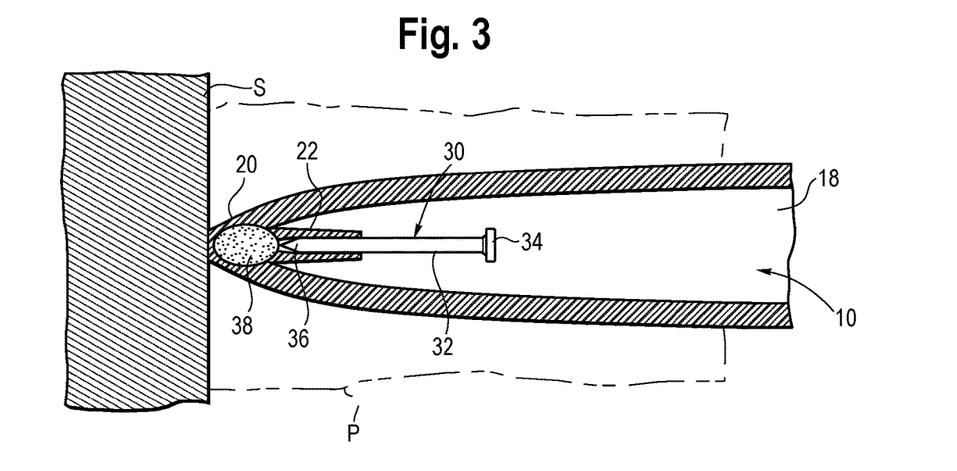
FIG. 3 is a partial cross-sectional view of the panel fastener of FIG. 1, installed in a panel, before securing to an underlying substrate.

FIG. 3 is a diagram showing a portion of panel fastener 10 in relation to the substrate S, according to an embodiment described herein. Referring to FIGS. 2 and 3, the panel fastener 10 further includes a substrate fastening portion 30. In one embodiment, the substrate fastening portion 30 may include a pin 32 that, in a first condition or position, is positioned in the interior space 18 of the body 12. In one embodiment, the pin 32 is positioned at or near the penetrating tip 20 of the elongated shank 16. The pin 32 includes a head 34 and a leading end 36.

In one embodiment, and with further reference to FIG. 3, the panel fastener 10 may further include a holding mechanism 38 connected to the substrate fastening portion 30. The holding mechanism 38 may be, for example, an adhesive capsule 38 containing an adhesive and positioned in the interior space 18, preferably at or near the penetrating tip 20. In one example, the adhesive capsule 38 is positioned between the leading end 36 of the pin 32 and the penetrating tip 20 of the body 12.

A guide 22 may be disposed in the interior space 18 for positioning the pin 32 relative to the capsule 38 and the penetrating tip 20. For example, the guide 22 may allow the pin 32 to be positioned such that the leading end 36 of the pin 32 is near, adjacent to, or abutting the adhesive capsule 38. The guide 22 may be formed either as part of the body 12 or as part of the substrate fastening portion 30.

Figure 4:
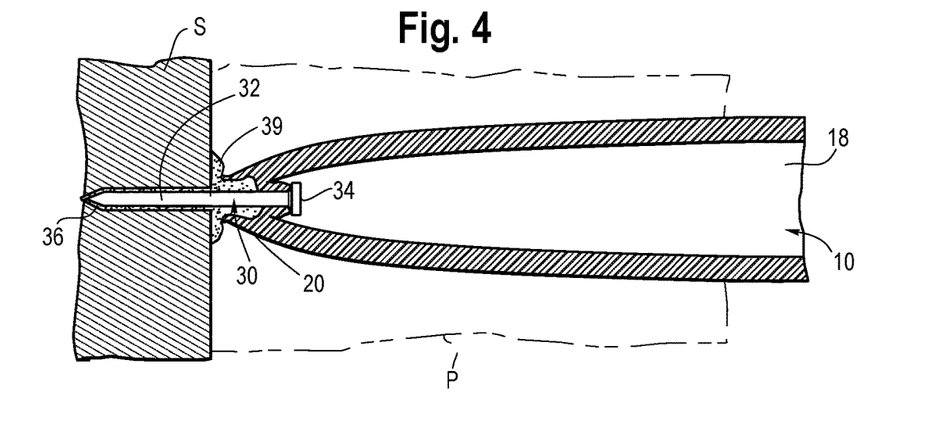
FIG. 4 is a partial cross-sectional view of the panel fastener of FIG. 1, installed in a panel, after securing to an underlying substrate.

FIG. 4 is a diagram showing the pin 32 in a second, or fastened condition or position, according to an embodiment described herein. To move the pin 32 to the fastened condition, a driving force is applied to the pin 32, for example, the head 34 of the pin 32. The driving force drives the pin 32 at least partially through the interior space 18 and the penetrating tip 20 so that the pin 32 penetrates and extends into the substrate S.

With further reference to FIG. 4, the guide 22 may be collapsible or otherwise deformable, such that the guide 22 collapses or deforms when the driving force drives the head 34 of the pin 32 into the guide 22. The capsule 38 may be breakable or deformable as the leading end 36 of the pin 32 is driven therethrough. That is, in the example above, the driving force may drive the leading end 36 of the pin 32 through the adhesive capsule 38 to puncture and rupture the adhesive capsule 38 allowing for release of the adhesive 39. The leading end 36 also penetrates through the penetrating tip 20 of the shank 18 and into the substrate S. Adhesive 39 from the adhesive capsule 38 may coat the pin 32 as the pin is driven into the substrate S. In addition, the adhesive 39 from the adhesive capsule 38 may flow from the interior space 18 to an exterior portion of the shank 18 and form an adhesive bond between the shank 18 and the panel P, the substrate S and/or the pin 32. The adhesive capsule 38 may be formed has a breakable barrier or membrane that contains the adhesive 39. Alternatively, the adhesive capsule 38 may be a preformed mass of adhesive 39, without a barrier or membrane, that deforms and moves or flows to coat the pin 32 when the pin 32 is driven therethrough. In such an example, the adhesive capsule 38 and the adhesive 39 may be one and the same. The adhesive 39 may seal around the pin 32 at an interface with the substrate S so as to prevent or limit air and/or moisture from penetrating the substrate S. That is, the adhesive 39 may form an air and/or moisture barrier between the pin 32 and the substrate S.

It is understood that the pin 32 may be formed separately from the body 12 and driven into and through the interior space 18 of the body 12 body by a driving tool. That is, in some embodiments, the pin 32 may be initially positioned in the guide 22 for receiving the driving force, while in other embodiments, the pin 22 may be introduced and driven into, and at least partially through, the interior space 18 by the driving tool.

Figure 5:
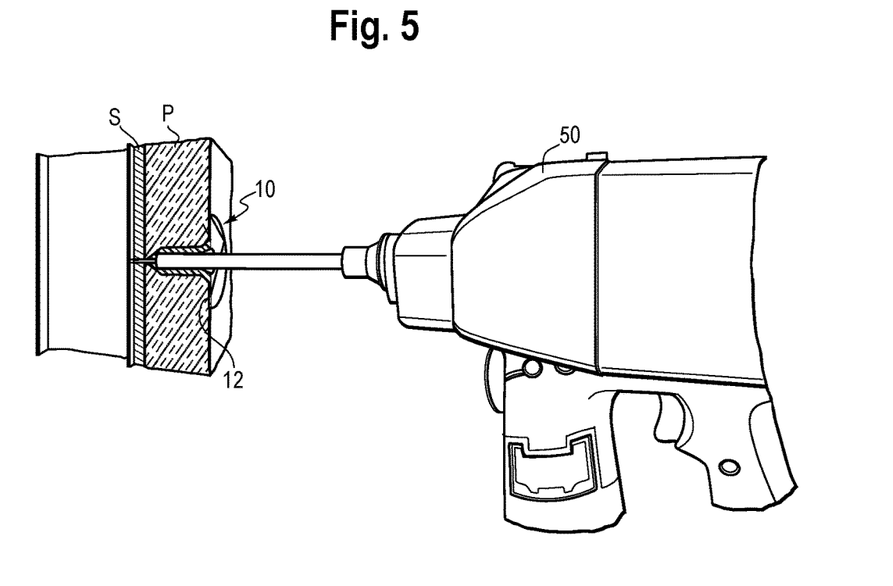
FIG. 5 is a cross-sectional perspective view of a driving tool operating on the panel fastener of FIG. 1.
Figure 6:
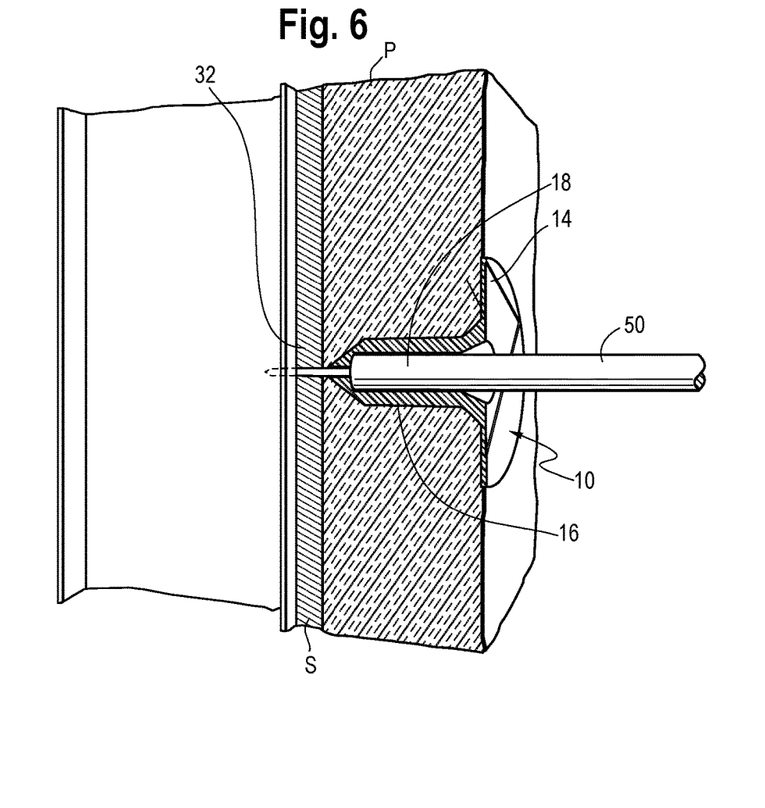
FIG. 6 is a partial, expanded cross-sectional view of the driving tool operating on the panel fastener of FIG. 1.

FIGS. 5 and 6 are perspective views of a driving tool 50 driving the pin 32 through the interior space 18 of the body 12 and into the substrate S, according to an embodiment described herein. Referring to FIGS. 1-6, the body 12 may be driven into and disposed in a panel P such that collar 14 engages an outer surface of the panel P and the elongated shank 16 extends substantially through a thickness of the panel P. A portion of the driving tool 50 may be inserted into the interior space 18 of the body 12 to engage the pin 32, for example, at the head 34 of the pin 32. The driving tool 50 may then provide the driving force to drive the leading end 36 of the pin 32 through the adhesive capsule 38 and the penetrating tip 20 of the body 12, and into the substrate S.

In use, with the pin 32 in the first position, the driving force applied to the pin 32 drives the pin 32 through the adhesive capsule 38 causing the adhesive capsule 38 to rupture. Adhesive 39 from the adhesive capsule 38 coats the pin 32 as the pin 32 is driven through the penetrating tip 20 to a second position in the substrate S. Accordingly, the adhesive 39 may form a bond between the pin 32 and the substrate S. The bond formed by the adhesive may be stronger than a frictional bond formed between a pin and substrate S alone, and thus, a stronger holding force may be realized. In addition, the adhesive 39 may flow from the adhesive capsule 38 to form an adhesive bond between one or more combinations of the body 12, the pin 32, the panel P and the substrate S.

By coating the pin 32 with the adhesive 39 to form an adhesive bond between the pin 32 and substrate S, an adhesive bond may be formed that provides a sufficient holding strength without having the pin 32 received in a stud underlying the substrate S. Accordingly, the panel fastener 10 may be used in applications with a thin or hollow substrate where frictional contact between the pin 32 and the substrate S may be limited. In addition, the panel fastener 10 described in the embodiments above need not be received in a stud underlying the substrate S to provide a sufficient holding force. In addition, with the adhesive 39 coated on the pin 32, an adhesive bond may be formed between the pin 32 and an interior of the substrate S. For example, where the substrate S is a gypsum board, an adhesive bond may be formed between the pin 32 and gypsum within the gypsum board to provide increased holding strength relative to a no-adhesive configuration.

In some embodiments, the substrate S may be, for example, a gypsum board or other hollow or thin substrate. The panel P, in some embodiments, may be a panel of rigid or semi-rigid insulation. The adhesive may be a fast curing glue or the like.

It is understood, however, that the present disclosure is not limited to the embodiments above, and sufficient holding strength of the panel P to the substrate S may be provided through alternative configurations. For example, FIGS. 7-9 show an example of a panel fastener 110 according to another embodiment described herein.

Figure 7:
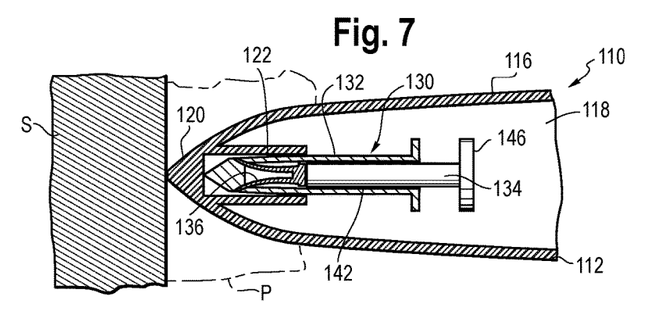
FIG. 7 is a partial cross-sectional view of a panel fastener for installing a panel before securing to an underlying substrate, according to another embodiment described herein.
Figure 8:
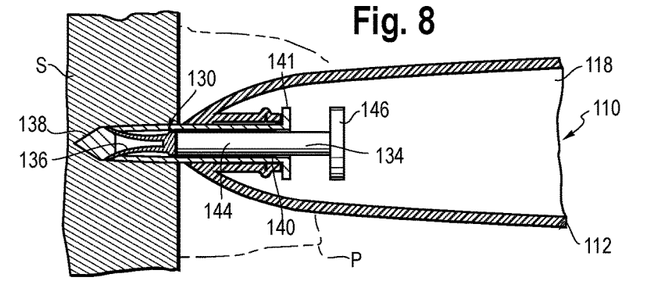
FIG. 8 is a partial cross-sectional view of the panel fastener of FIG. 7 during securing to an underlying substrate.
Figure 9:
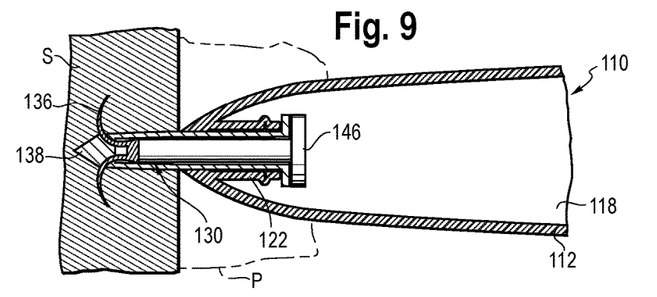
FIG. 9 is a partial cross-sectional view of the panel fastener of FIG. 7 after securing to an underlying substrate.

In the embodiments shown in FIGS. 7-9, panel fastener 110 may include a body 112 formed substantially similar to the body 12 described in the embodiments above. For example the body 112 may include a collar (not shown) and an elongated shank 116 defining an interior space 118 and having a penetrating tip 120 configured for penetrating a panel P.

With further reference to FIGS. 7-9, the panel fastener 110 includes a substrate fastening portion 130. In this embodiment, the substrate fastening portion 130 may include a two-part pin having an anchor 132 for driving or penetrating into the substrate and an actuator pin 134 configured for movement relative to the anchor 132. The actuator pin 134 includes a holding mechanism 136 extending from one end thereof. In one embodiment, the holding mechanism 136 may be formed as fastening teeth 136. The fastening teeth 136 are configured to spread through the anchor 132 and engage the substrate S in response to application of a sufficient driving force to the substrate fastening portion 130 such that the actuator pin 134 moves relative to the anchor 132. That is, the actuator pin 134 is configured to actuate the fastening teeth 136 to engage the substrate S. The fastening teeth 136 may include, for example, one to six fastening teeth. In a preferred embodiment, the fastening teeth 136 may include two to four fastening teeth 136. However, it is understood that the present disclosure is not limited to these examples, and different numbers of teeth, including more than six fastening teeth, may be used as suitable. For example, increasing the number of teeth may increase the holding strength within the substrate S.

Referring to FIG. 7, the body 112 may include a guide 122 formed in the interior space 118 of the elongated shank 116. In one embodiment, the guide 122 extends from the penetrating tip 120 of the elongated shank 116 within the interior space 118. The anchor 132 may be at least partially positioned within the guide 122. A leading end 138 of the anchor 132 may be positioned adjacent to the penetrating tip 120 of the elongated shank 116. The anchor 132 also includes a receiving end 140, at an end opposite from the leading end 138, that is configured to receive the actuator pin 134 and fastening teeth 136 into an internal cavity 142 of the anchor 132. The actuator pin 134 may be received and held in the internal cavity 142 of the anchor 132 by fastening force. In one embodiment, the fastening teeth 136 may be curved and extend at least partially into a thickness of the anchor 132. The actuator pin 134, in an initial position, has a shank 144 that is partially received in the internal cavity 142, and a head 146 that is spaced from the receiving end 140 of the anchor 132. The fastening teeth 136 extend from an axial end of the shank 144 within the internal cavity 142.

Referring to FIGS. 7 and 8, the driving force may be applied to the substrate fastening portion 130 such that the anchor 132 and actuator pin 134 may be driven together. In one example, a driving tool applies to the driving force to the head 146 causing the leading end 138 of the anchor 132 to penetrate through the penetrating tip 120 of the elongated shank 116 and into the substrate S. The fastening force between the actuator pin 134 and the anchor 132 allows the actuator pin 134 and anchor 132 to move together upon application of the driving force to the head 146. In one example, the fastening force may result from a friction fit engagement between the actuator pin 134 and the anchor 132. However, it is understood that he present disclosure is not limited to this configuration, and that the fastening force may result from other types of engagement between actuator pin 134 and anchor 132, including engagements formed with additional fasteners. Referring to FIG. 8, a flange 141 formed at the receiving end 140 of the anchor 132 may come into contact and compress or deform the guide 122. The guide 122 provides a reaction force opposing the driving force that limits further movement of the anchor 132 into the substrate S.

Referring to FIG. 9, continued application of the driving force with the flange 141 against the guide 122 may cause the actuator pin 134 to slide within the internal cavity 142 (see FIG. 7) of the anchor 132 and bring the head 146 toward and/or into contact with the flange 141 of the anchor 132. That is, the reaction force of the guide 122 opposing further movement of the anchor 132 into the substrate S may be stronger that a force needed to pierce the penetrating tip 120 and the substrate S. In addition, the reaction force may be sufficient overcome the fastening force between the anchor 132 and the actuator pin 134 to allow the pin 134 to slide within the anchor 132. Accordingly, the guide 122 may substantially hold the anchor 132 against further movement into the substrate S while the actuator pin 134 continues to move within the anchor 132 toward the substrate S. The guide 122 may deform or compress when flange 141 is brought into contact therewith to absorb energy and gradually limit further movement of the anchor 132 into the substrate S. Movement of the actuator pin 134 relative to the anchor 132 within the cavity 142 actuates the fastening teeth 136. When actuated, the fastening teeth 136 are configured to penetrate through the anchor 132 and move generally outward, for example, in a radial direction relative to the anchor 132. The fastening teeth 132 are configured to drive into the substrate S, and in one embodiment, may form a generally arcuate profile in cross-section.

With further reference to FIG. 9, the panel fastener 110, and in particular, the substrate fastening portion 130 and the anchor 132 is configured so as to penetrate only partially into the substrate S. That is, in one embodiment, the leading end 138 of the anchor 132 does not penetrate completely through the substrate S. A depth of penetration of the anchor 132 into the substrate S is limited by the guide 122 contacting the flange 141 of the anchor 132 to prevent or limit further penetration into the substrate S.

By only partially penetrating the substrate S, a partial thickness of the substrate S remains between the leading end and a side of the substrate S opposite to the side where the panel P is positioned. Accordingly, the substrate S may prevent or limit moisture and/or air passage along the panel fastener 110. That is, the partial thickness of the substrate S between the leading end 138 and the side of the substrate S opposite to the side where the panel P is fastened may prevent or limit air and/or moisture flow along the anchor 132. Thus, the air and/or moisture sealing properties of the substrate S may be maintained. In addition, the substrate S may serve as a fire barrier.

Accordingly, in the embodiments shown in FIGS. 7-9, the body 112 may be driven into the panel P such that the elongated shank 116 is positioned in the panel P and the collar (not shown) engages an outer surface of the panel P. With the body 12 installed in the panel P, the penetrating tip 120 is positioned adjacent to the substrate S. The substrate fastening portion 130 may then have the driving force applied thereto. In response to the driving force, the anchor 132 moves together with the actuator pin 134 from a first position in the interior space 118 to a second position. The anchor 132 and the actuator pin 134 move together due to the fastening force between the anchor 132 and the actuator pin 134. In the second position the leading end 138 of the anchor 134 may be driven through the penetrating tip 120 of the body 112 and into the substrate S with the flange 141 moving into contact with the guide 122. A frictional contact may then be formed between an exterior surface of the anchor 132 and the substrate S.

Continued application of the driving force, together with the reaction force from the guide 122 against the flange 141 of the anchor 132, overcomes the fastening force between the anchor 132 and actuator pin 134 and causes the actuator pin 134 to move relative to the anchor 132 and actuate the fastening teeth 136. Accordingly, the anchor 132 and actuator pin 134 may first be driven together so that the anchor 132 penetrates through the penetrating tip 120 and into the substrate S. Subsequently, after the fastening force between the anchor 132 and actuator pin 134 is overcome, the actuator pin 134 may be driven to move relative to the anchor 132 to actuate the fastening teeth 136. The fastening teeth 136 may be actuated to penetrate through the anchor 132 and into the substrate S to provide an additional holding or retaining force, supplementing the frictional connection between the anchor 132 and the substrate S.

Figure 10:
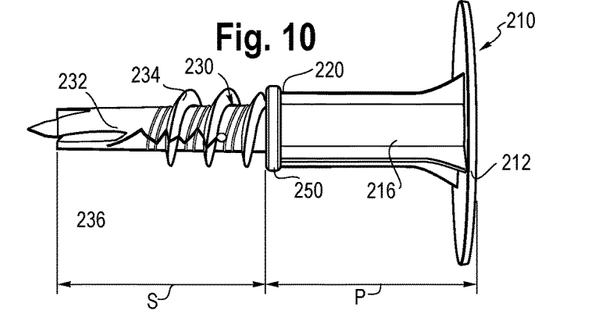
FIG. 10 is a side view of a panel fastener according to another embodiment described herein.

FIG. 10 shows a panel fastener 210 according to another embodiment described herein. Referring to FIG. 10, the panel fastener 210 includes a body 212 having a collar 214 and elongated shank 216. An interior space (not shown) may be formed in the elongated shank 216. A substrate fastening portion 230 extends from a distal end 220 of the body 212. A washer 250 may be positioned at a juncture of the distal end 220 and the substrate fastening portion 230. The washer 250 may be made from elastomeric material or the like. In one embodiment, the washer 250 is rubber. The washer 250 may serve as an air and/or moisture barrier or seal to prevent or limit air and/or moisture from penetrating the substrate S in the region of the panel fastener 210.

In one embodiment, the substrate fastening portion 230 may be formed as a pin 232. The pin 232 and the body 212 extend in series. The pin 232 is configured to be driven into, and penetrate, the substrate S. The pin 232 may include a retaining mechanism 234. In one embodiment the retaining mechanism may be formed as, for example, screw threads 234 on an exterior surface of the pin 232. The pin 232 may also include a leading section 236 configured to create a pilot hole in the panel P and/or substrate S for the retaining mechanism 234.

In use, the body 212 may be driven into a panel P so that the collar 214 engages an outer surface of the panel P. In one embodiment, the body 212 is rotationally driven into the panel P. The washer 250 is configured to seal around the body 212 and/or the pin 232 so as to form an air and moisture barrier on an exterior of the body 212 and/or pin 232. The washer 250 may also act as a rotational stop. The pin 232 is configured to penetrate into the substrate S in response to application of the driving force. A holding force of the pin 232 in substrate S may be attributed, in part, to a frictional contact between the pin 232 and the substrate S and both frictional and interlocking contact between the threads 234 and the substrate S. The panel fastener 210 may be driven by, for example, a Philips driver bit. Thus, the driving force may be a rotational driving force. However, it is understood that the present disclosure is not limited to this example.

It is understood that features from various embodiments above may be used together even if not expressly described above or shown in the figures. For example, the adhesive capsule 38 may be incorporated together and used with the panel fasteners 110, 210 described above. Further, an air and/or moisture barrier or seal between the substrate fastening portion and the substrate may be implemented in, or used together with, each of the panel fasteners 10, 110, 210 described above. The air and/or moisture barrier may be formed by, for example, the adhesive 39 or washer 250 described above. The panel fasteners described above may include a portion that is made of a non-conductive material, for example, plastic and the like, to prevent or limit thermal transfer or thermal bridging. In particular, the embodiments above, the body portions and/or shanks may be made from the non-conductive material. In some embodiments, the pins may be made from a metallic material, including, but not limited to, steel. In other embodiments, the pin may be made from a non-conductive material, such as plastic or the like.

It is understood that various features described in relation to one embodiment above may be implemented or used together with the other embodiments described above. It is also understood that description of certain components or features may be omitted in the discussion of one embodiment where such components or features are similar or identical to those described in other embodiments.

All patents and patent applications referred to herein, are incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

It will be appreciated by those skilled in the art that the relative directional terms such as upper, lower, rearward, forward, top, bottom and the like are for explanatory purposes only and are not intended to limit the scope of the disclosure.

It should also be understood that various changes and modifications to the presently disclosed embodiments will be apparent to those skilled in the art. Such changes and modifications can be made without departing from the spirit and scope of the present disclosure and without diminishing its intended advantages. It is therefore intended that such changes and modifications be covered by the appended claims.

The invention claimed is:

1. A panel fastener for fastening a panel to a substrate, the panel fastener comprising:
   a body having a collar and an elongated shank extending from the collar, the elongated shank defining an interior space and having a penetrating tip disposed at an end opposite of the collar;
   a substrate fastening portion configured to be driven into the substrate, the substrate fastening portion comprising a pin having a head and a leading end; and
   a holding mechanism connected to the substrate fastening portion and configured to engage the substrate, the holding mechanism comprising an adhesive,
   wherein in a first position, the pin is disposed within the interior space and the adhesive is an adhesive capsule positioned between the leading end of the pin and the penetrating tip.

2. The panel fastener of claim 1, wherein in a second position, the pin extends outwardly from the penetrating tip and at least a portion of the adhesive is coated on the pin.

3. The panel fastener of claim 2, wherein the adhesive forms an air and/or moisture barrier between the pin and the substrate to prevent air and/or moisture penetration into the substrate.

4. The panel fastener of claim 1, further comprising a guide disposed in the interior space, the guide configured to receive the pin.

5. The panel fastener of claim 1, further comprising an air and/or moisture seal between the substrate fastening portion and the substrate.

6. The panel fastener of claim 1, wherein the substrate is a gypsum board.

7. The panel fastener of claim 1, wherein the panel is a panel of rigid insulation.

8. A panel fastener for fastening a panel to a substrate, the panel fastener comprising:
   a body having a collar and an elongated shank extending from the collar, the elongated shank defining an interior space and having a penetrating tip disposed at an end opposite of the collar;
   a substrate fastening portion configured to be driven into the substrate; and
   a holding mechanism connected to the substrate fastening portion and configured to engage the substrate,
   wherein the substrate fastening portion is an anchor having an internal cavity and an actuator pin positioned at least partially within the internal cavity and movable relative thereto, and the holding mechanism comprises one or more fastening teeth configured to project from the anchor.

9. The panel fastener of claim 8, wherein in a first position the anchor is disposed in the interior space, the actuator pin comprises a head that is spaced from a receiving end of the anchor, and the fastening teeth extend from the actuator pin and are disposed within the anchor.

10. The panel fastener of claim 9, wherein in a second position the anchor extends outwardly from the penetrating tip of the shank, the head of the pin contacts the receiving end of the anchor, and the fastening teeth project outwardly from the anchor.

11. The panel fastener of claim 10, wherein in the second position, the anchor projects partially, but not completely through the substrate such that a partial thickness of the substrate remains between a leading end of the anchor and a side of the substrate opposite to the side through which the anchor is received therein.

12. The panel fastener of claim 11, further comprising a guide disposed in the interior space and configured to receive the anchor.

13. The panel fastener of claim 12, wherein the guide limits a depth of penetration of the anchor into the substrate.

14. A panel fastener for fastening a panel to a substrate, the panel fastener comprising:
   a body having a collar and an elongated shank extending from the collar, the elongated shank defining an interior space and having a penetrating tip disposed at an end opposite of the collar;
   a substrate fastening portion configured to be driven into the substrate; and
   a holding mechanism connected to the substrate fastening portion and configured to engage the substrate,
   wherein the substrate fastening portion comprises a pin extending from a distal end of the body and the holding mechanism comprises a screw thread positioned on an exterior of the pin.

* * * * *

UNITED STATES PATENT AND TRADEMARK OFFICE
CERTIFICATE OF CORRECTION

PATENT NO.        : 10,228,007 B2
APPLICATION NO.   : 15/367547
DATED             : March 12, 2019
INVENTOR(S)       : Nicolas Gyurkovics, Jr. et al.

Page 1 of 1

It is certified that error appears in the above-identified patent and that said Letters Patent is hereby corrected as shown below:

In the Specification

In Column 1, Line 55, delete "is secured" and insert -- is secured. --, therefor.
In Column 2, Line 58, delete "is cross-sectional" and insert -- is a cross-sectional --, therefor.
In Column 3, Line 32, delete "elongated shank 18" and insert -- elongated shank 16 --, therefor.
In Column 3, Line 38, delete "engages and outer" and insert -- engages an outer --, therefor.
In Column 4, Line 23, delete "shank 18" and insert -- shank 16 --, therefor.
In Column 4, Line 27, delete "shank 18" and insert -- shank 16 --, therefor.
In Column 4, Line 28, delete "shank 18" and insert -- shank 16 --, therefor.
In Column 4, Line 43, delete "body 12 body" and insert -- body 12 --, therefor.
In Column 4, Line 46, delete "pin 22" and insert -- pin 32 --, therefor.
In Column 6, Line 34, delete "that he" and insert -- that the --, therefor.
In Column 6, Line 51, delete "stronger that" and insert -- stronger than --, therefor.
In Column 6, Line 53, delete "sufficient overcome" and insert -- sufficient to overcome --, therefor.
In Column 6, Line 67, delete "fastening teeth 132" and insert -- fastening teeth 136 --, therefor.

Signed and Sealed this
Twentieth Day of August, 2019

Andrei Iancu
*Director of the United States Patent and Trademark Office*